W. F. MURPHY.
DEVICE FOR LOCKING TIRES AND DEMOUNTABLE RIMS TO CARRIERS.
APPLICATION FILED AUG. 3, 1920.
1,361,086.
Patented Dec. 7, 1920.
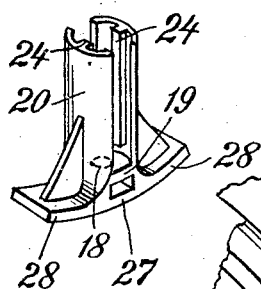
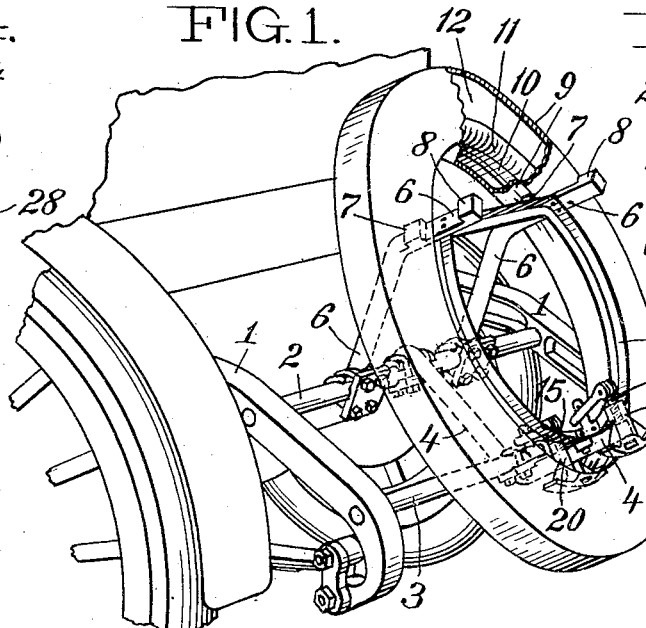
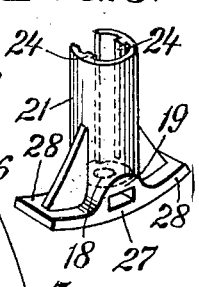
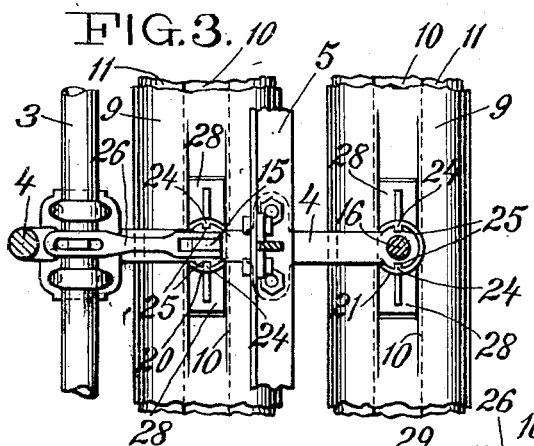
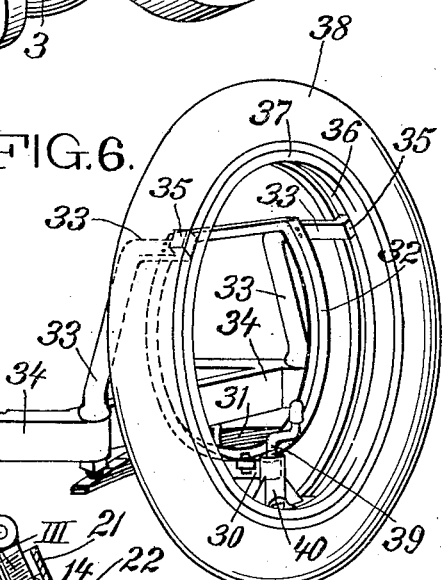
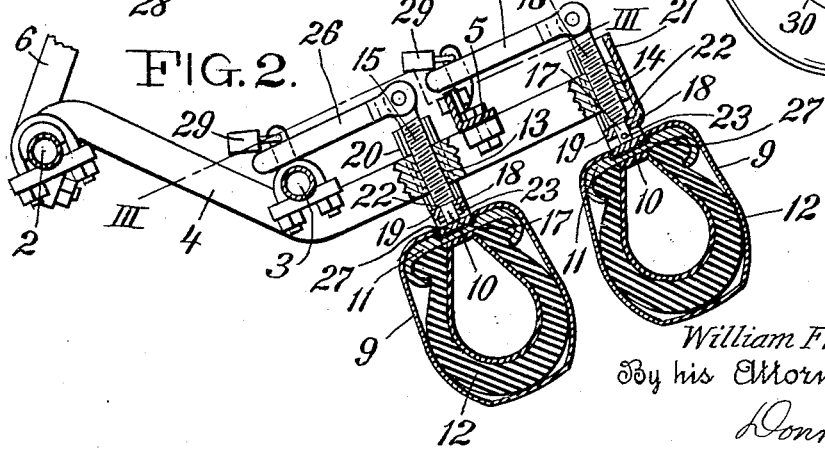
Inventor
William Francis Murphy
By his Attorney
Donn Twitchell

UNITED STATES PATENT OFFICE.

WILLIAM FRANCIS MURPHY, OF TOMPKINSVILLE, NEW YORK.

DEVICE FOR LOCKING TIRES AND DEMOUNTABLE RIMS TO CARRIERS.

1,361,086.   Specification of Letters Patent.   Patented Dec. 7, 1920.

Application filed August 3, 1920. Serial No. 401,008.

*To all whom it may concern:*

Be it known that I, WILLIAM FRANCIS MURPHY, a citizen of the United States, and a resident of Tompkinsville, borough of Richmond, city of New York, in the county of Richmond and State of New York, have invented a certain new and useful Device for Locking Tires and Demountable Rims to Carriers, of which the following is a specification.

This invention relates to carriers having several radially extending members adapted for engagement with an annular groove formed on the interior of the rim, one of said members being movable radially.

The object is to provide the movable member with a device for locking or securing the tire and rim to the carrier, without injury to the protective covering usually provided, which device will also serve to prevent breakage of the screw which actuates it.

The invention consists in a shoe adapted to fit in the annular groove of the rim or to force the protective covering therein, which shoe is journaled on the end of the radially extending screw forming part of the movable member; the shoe also having guides in engagement with guides formed on the carrier parallel to the longitudinal axis of the screw.

In the accompanying drawing, Figure 1 is a perspective view of the rear end of an automobile having a carrier frame with my improvement as applied with one rim and tire with protective covering locked in place, and also in position to receive a second rim, tire and cover. Fig. 2 is a sectional elevation of part of the carrier frame with my device in position for locking two rims, tire and cover. Fig. 3 is a section on the line III—III of Fig. 2. Fig. 4 is a perspective view of the shoe that is used for locking the first rim, tire and cover. Fig. 5 is a perspective view of the shoe for locking the second rim, tire and cover. Fig. 6 is a perspective view of a modified form of carrier frame with my improvement applied.

Referring to Figs. 1, 2 and 3, the automobile frame 1 is provided with the cross rods 2 and 3 to which is secured the carrier frame consisting of an arm 4 having the hoop 5 attached, which latter is attached to arms 6 secured to the cross rod 2. Each arm 6 is provided with projections 7 and 8 extending radially from the center of hoop 5, the extension 7 being shown in Fig. 1 as forcing the protective covering 9 into the annular groove 10 formed on the interior of the demountable rim 11 which carries the tire 12. The arm 4 is provided with holes 13 and 14 having screw threads, which are engaged by screws 15 and 16 extending radially from the center of hoop 5. The outer end of each screw is reduced in diameter, as shown at 17, which end is free to rotate in a hole 18, formed in the end 19 of shoes 20 and 21. The end 19 of shoes 20 and 21 is held against shoulder 22 of the screws by means of a cotter pin 23. Each shoe is provided with guides 24 which are in engagement with guides 25 placed on arm 4 parallel to the longitudinal axis of the screw to which it is connected. It will be evident that when either one of the screws is rotated by means of the handle 26 pivoted thereto the screw, together with the shoe journaled thereon will be moved radially inward or outward, and that the guides will cause the shoe to move parallel with the screw, and overcome any tendency of the shoe to be rotated by the screw. It will also be evident that any lateral strain placed upon the shoe will be sustained by the guides, and thereby prevent possible injury to the screw. The possibility of the end 17 of the screw and the cotter pin 18 being injured or causing injury to the protective covering 9 of the tire is prevented by means of a bridge or cover 27 which is part of the extreme outer end of the shoe and which has rectangular lateral extensions 28 which are formed concentric with the annular groove 10 of the rim.

By reference to Figs. 1 and 2, it will be seen that the shoe 20 has, by means of the screw 15, been moved radially outward thereby forcing the protective covering 9 into the annular groove 10 and as the rim is then held by the joint engagement therewith of the shoe 20 and radial extensions 7 of arms 6, the rim, tire and cover are locked in place. To prevent unlocking of the same, the handle 26 for actuating the screw may be secured by means of padlock 29.

As shown in Fig. 1, the shoe 21 has been moved radially inward by means of the screw 16, in which position, a second rim, tire and cover may be hung upon the radial extensions 8 of arms 6 and the lower end of the tire moved past the shoe 21, until the shoe is in range with the annular groove 10 of the rim, when the screw 16 may be rotated, and thereby cause the shoe 21 to be moved radially and force the protective cover 9 into the annular groove.

In Fig. 6 is shown a carrier frame in which an arm 30 is secured to the cross spring 31 of the automobile, the hoop 32 being attached to the arm 30 and to arms 33 which are secured to the automobile frame 34. Each arm 33 is provided with a radial extension 35 which is here shown as entering the annular groove 36 of the rim 37 on which the tire 38 is mounted.

The arm 30 is provided with the screw 39 which is connected to a shoe 40 constructed similar to that shown in Fig. 5.

Having described my invention, what I claim is:

1. In a carrier for tires on rims that are demountable from automobile wheels, said carrier having several radially extending members adapted for engagement with an annular groove formed on the interior of the rim, one of said members consisting of a radially extending screw engaging screw threads formed on the carrier; the combination with guides formed on said carrier parallel to the longitudinal axis of said screw, of a shoe adapted for movement in said guides; said shoe being journaled to said screw in such a manner that rotation of the screw causes movement of said shoe into or out of engagement with said annular groove.

2. In a carrier for tires on rims that are demountable from automobile wheels and provided with a protective covering said carrier having several radially extending members adapted for engagement with an annular groove formed on the interior of the rim, one of said members consisting of a radially extending screw engaging screw threads formed on the carrier; the combination with guides formed on said carrier, parallel to the longitudinal axis of said screw, of a shoe adapted for movement in said guides; said shoe being journaled to said screw in such a manner that rotation of the screw will cause said shoe to be moved outward, thereby causing said protective covering to be forced therewith into said annular groove, said guides serving to prevent rotation of said shoe and consequent injury to said protective covering.

3. In a carrier for tires on rims that are demountable from automobile wheels, said carrier having several radially extending members adapted for engagement with an annular groove formed on the interior of the rim, one of said members consisting of a radially extending screw engaging screw threads formed on the carrier; the combination with guides, formed on said carrier parallel to the longitudinal axis of said screw, of a shoe adapted for movement in said guides; said shoe being journaled to said screw in such a manner that rotation of the screw causes movement of said shoe outward, into engagement with said annular groove, said guides causing said shoe to receive lateral strain.

Signed at New York city in the county of New York and State of New York this 31st day of July A. D. 1920.

WILLIAM FRANCIS MURPHY.